May 7, 1940.  F. H. MUELLER ET AL  2,199,647
PIPE CONNECTION AND SEALING MEMBER
Filed Sept. 12, 1938
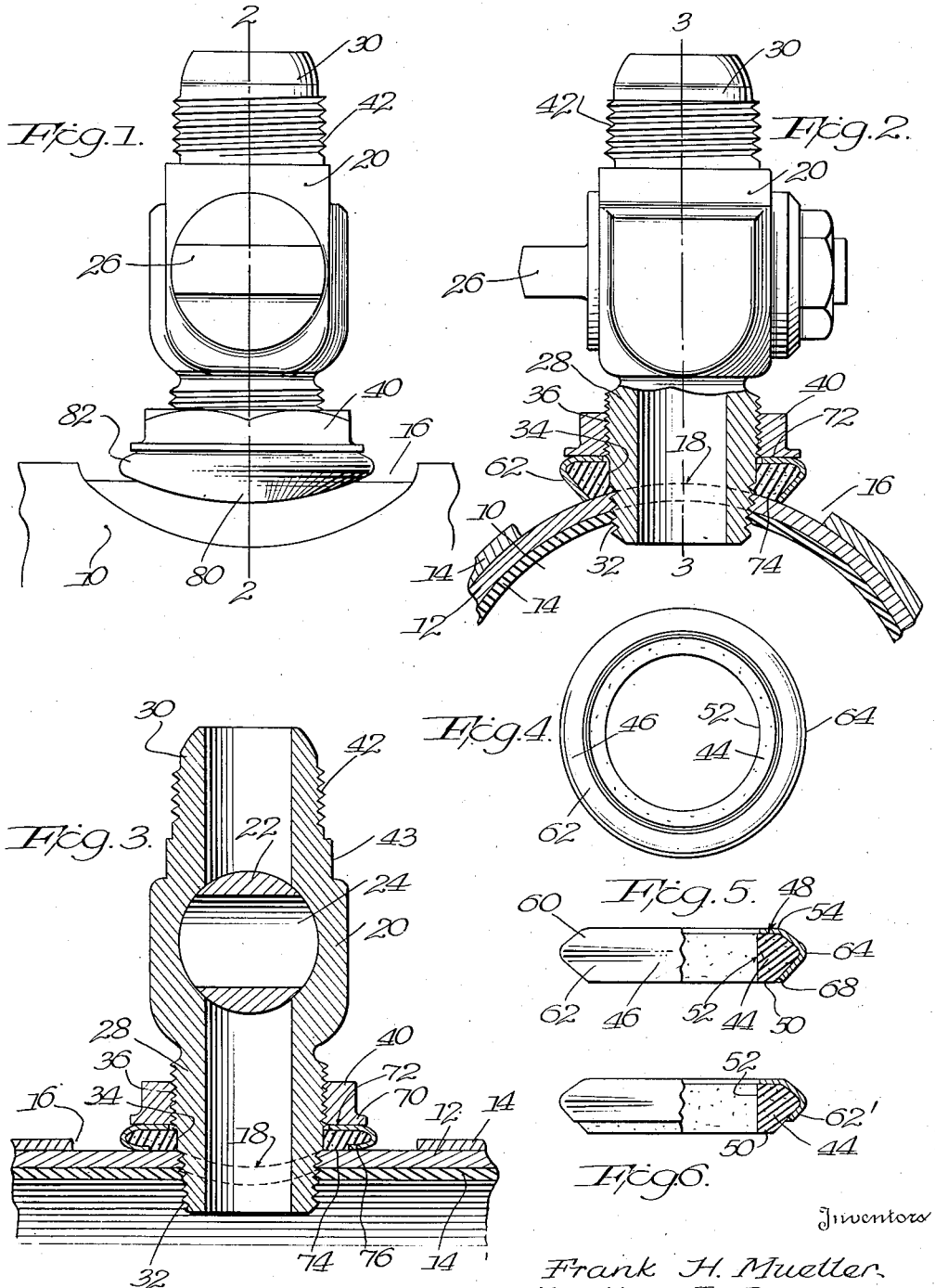
Inventors
Frank H. Mueller,
Walter J. Bowan,
Elmer H. Fawley
By Cushman, Darby & Cushman
Attorneys Patented May 7, 1940

2,199,647

UNITED STATES PATENT OFFICE 2,199,647

PIPE CONNECTION AND SEALING MEMBER

Frank H. Mueller, Walter J. Bowan, and Elmer H. Fawley, Decatur, Ill., assignors to Mueller Co., Decatur, Ill., a corporation of Illinois Application September 12, 1938, Serial No. 229,578

4 Claims. (Cl. 285—55)

The present invention relates to a pipe connection, specifically an assembly for attaching a tubular fitting in the wall of a chamber to make a connection with said chamber for flow of fluid.

The invention is shown and described in connection with the attaching of a fitting in the wall of such a chamber as a fluid conduit. The invention is adapted for use in connecting a fitting for a branch line into a main conduit which is already in place in a system. The connection can be conveniently made at any desired location as distinguished from one which can only be effectively made in the shop, and it can be made by untrained personnel.

The invention mainly comprises a fitting which is adapted to be threaded through the wall of a conduit, and a deformable sealing ring around the fitting, which ring is compressed against the outer wall of the conduit by a follower nut mounted on the fitting, to thereby deform the sealing ring to the shape of the conduit, resulting in the formation of a tight seal at the junction of the fitting with the conduit. The construction of the sealing ring is such that when it is compressed against the union of the conduit and fitting, the packing within the ring remains completely confined by a carrier of thin deformable material, the packing being forced against the walls of the fitting and the conduit.

The sealing ring disclosed herein is particularly adapted for forming a seal between a fitting and a curved wall of a chamber, such as a substantially cylindrical wall of a conduit. The sealing ring is effective as a seal when used with relatively small conduits; i. e., conduits whose outside curvature is relatively steep.

In the drawing which is illustrative of the preferred form of the connection, and one modified form of the sealing ring, which drawing is illustrative and does not restrict the invention to any specific form:

Figure 1 is an end elevation of the fitting looking laterally of the conduit, showing the fitting connected in place;

Figure 2 is a side elevational view of the fitting, looking longitudinally of the conduit, the lower end of the fitting and the conduit being in section to show the construction at the connection;

Figure 3 is a vertical sectional view taken along the line 3—3 of Figure 2;

Figure 4 is a bottom elevational view of the preferred form of the sealing ring;

Figure 5 is a partial side elevational and sectional view of the preferred form of the sealing ring of Figure 4; and Figure 6 is a view similar to Figure 5, of a modified form of the sealing ring.

One of the principal uses of the present invention is for installing a branch pipe from a main gas or water line, which branch pipe is to be controlled adjacent the main line by a valve, known as a corporation cock. The invention has been effective in making connections with thin walled steel pipe, although obviously it is not confined to conduit walls of any particular thickness or material.

In Figure 1 the conduit is shown at 10, and it may comprise a thin steel pipe 12 covered interiorly and exteriorly with an appropriate coating material. When it is desired to make a connection, a sufficient outside area of the coating material is removed as at 16. The invention is, of course, useful with an uncovered conduit. When the area of the coating is removed, an opening 18 of predetermined size is drilled at the desired point through the wall of the conduit, and this opening is then tapped to form threads, shown as pipe threads in the present illustration.

The fitting is then threaded into this opening. By fitting, we mean to include a simple tubular connection, as well as a cock as illustrated in the drawing, or any other type of fitting.

The fitting disclosed comprises a valve body 20 having therein a rotatable valve plug 22 provided with the usual flow passage or bore 24 which can be turned to open or closed position by means of the extension 26 which protrudes belond the body of the cock, and is adapted to receive a wrench or other similar tool. The fitting has a lower nipple 28 and an upper nipple 30, and these nipples are provided with bores or passages for flow of fluid controlled by the valve member 22. By the use of the designations "upper" and "lower," we do not mean to be confined to any particular arrangement of the fitting on the conduit, but only use these terms to conveniently designate the relative arrangement of parts as they are shown in the drawing.

The lower nipple 28 is suitably equipped for connection with the curved wall of the conduit by pipe threads 32 adapted to coact with the threads in the opening 18. Above the area of the threads 32, the nipple has a relatively smooth narrow substantially cylindrical portion 34, which provides a sealing area or wall.

Above the area 34, the nipple 28 is provided on its exterior surface with a length of threads 36, which are shown as machine threads of shorter pitch than the threads 32, said threads coacting with similar machine threads on the interior of a nut or follower 40, which is mounted on the outside of the nipple, and serves to compress the sealing ring in a manner hereinafter described to effect the seal around the union of the fitting and the conduit. The smooth area 34 is in substantially the same circular surface of revolution as the bottom of the grooves of the threads 36.

The cock 20 is conveniently made integral with the nipple 28, and is of conventional construction, except that it is shown made heavy enough to withstand installation strains. The upper end of the cock comprises the nipple 30, provided with any appropriate type of connection, such as threads 42, for connection with the branch pipe line, and has a squared or otherwise flattened portion 43 where a wrench may be applied for obvious purposes.

The preferred form of the sealing member is shown in Figures 4 and 5. It comprises a ring of compressible packing material 44, such as rubber or rubber composition, and a hollow ring-shaped carrier of thin deformable metal 46 for housing said packing ring. The carrier may be made of copper or other similar thin material which will provide sufficient strength, yet which can be deformed to take the shape of the curved or other surface of the chamber to which the fitting is attached. The construction and shape of the sealing member is important, and that disclosed herein is designed to provide the most effective seal.

The packing ring has a flat top face 48 and a flat bottom face 50, and a straight inner wall 52 which is of cylindrical form. The outside wall of the packing ring is of peculiar construction, being arched in form as shown.

The carrier 46 has a flat top 54 which conforms with the flat top of the packing ring, and confines the upper side thereof, and has an arch-shaped outside wall which conforms with and confines the outside wall of the packing ring. While this outside wall may be of curved or elliptical form, we have found that most effective results are achieved when the outside wall of the sealing member comprises two flat areas 60 and 62 which meet at a bend 64 extending throughout the perimeter of said sealing member. The bend 64 is located slightly above the middle of the thickness of the sealing member. The flat conical faces 60 and 62 of the carrier join each other at the bend 64 at an angle of approximately 90°.

The packing material being confined within the carrier, also has outside conical areas similar to the areas 60 and 62 on the carrier. The lower conical portion 62 of the carrier ends in line with the flat inner side or bottom 50 of the packing ring, as shown at 68, for a reason which will be hereinafter apparent.

It will thus be seen that the carrier confines the packing ring on its exterior, but leaves it exposed on its interior, walls 52 and 50 of the packing ring constituting the inside thereof. Furthermore, it can also be said that the packing ring is confined by the carrier on its top and outer sides, and is exposed on its bottom and inner sides.

When the hole has been cut and the pipe threads tapped in the conduit, the fitting is threaded therein with the sealing member surrounding the nipple 28 and with the follower nut 40 in place. Due to the length of the threads 36 on the exterior of the nipple 28, the follower nut may be backed off far enough so that the sealing member can be spaced from the outside wall of the conduit at the termination of the insertion of the fitting through the opening in the conduit. Thus, any cuttings incident to insertion of the fitting can be brushed away so that the sealing ring will engage a smooth even surface.

The nipple 28 is threaded into the opening 18 until the lower edge of the flat surface 34 on the outside of the nipple is in line with the outer face of the conduit as shown in Figure 3.

The follower nut 40 is then tightened up along the threads 36, and as it is tightened, it engages the deformable sealing member and compresses it against the outer wall of the conduit, forcing the sealing member to take the curvature of the outer wall of the conduit. In order that the force of the follower nut may be applied to substantially the entire top of the sealing member, said follower has an outwardly extending flange 70 at its lower end. The bottom surface 72 of the follower is flat as shown.

As the outside wall of the carrier extends down to the bottom flat side of the packing ring as shown at 68 in Figure 5, none of the packing material can be forced outwardly beyond the lower edge of the outer wall of the carrier. That is, during the tightening of the follower nut 40, the carrier will keep the packing material confined against the surfaces which are to be sealed. The pressures built up in the packing material by compression of the same caused in turn by the compression of the carrier ring will act against the surfaces to be sealed; namely, the surface 34 on the nipple 28 and the outer curved surface of the conduit at 74 adjacent the union of the fitting and conduit.

When the follower nut is tightened up as far as desired, usually until its lower face 72 is at the bottom of the thread 36 on the nipple 28, the bottom of the sealing member will have been distorted until it generally takes a saddle shape corresponding with the outer wall of the conduit. As the conduit is cylindrical, its outside surface is straight longitudinally but curved laterally of the conduit, and this has in the prior art made it very difficult to secure a fluid-tight union. With the present invention, the union will be fluid-tight, and when pressure is applied to the sealing member, it accommodates itself to the different curvatures of the outside of the conduit.

A comparison of Figures 2 and 3 indicates the manner in which the sealing member accommodates itself to the conduit. Figure 2 is a section taken laterally of the conduit, where the curvature of the latter is the most pronounced. In this plane, the deformation of the sealing member will be a minimum, said distortion being probably confined to the bending of the upper conical face 60 of the carrier downwardly until it is substantially flat. The downward flattening of the upper portion of the carrier causes two resultant forces to act within the packing ring, one acting downwardly against the outer curved wall of the conduit, and another inwardly against the smooth wall 34 of the nipple 28. The portion 62 of the carrier keeps the outside of the packing confined, and thus the pressures due to distortion of the sealing member are used against the aforementioned sealing surfaces.

In Figure 3, the more pronounced distortion of the sealing member in a plane taken longitudinally of the conduit will be noted. In this plane, the packing ring may be compressed to only about half of its initial thickness, and in addition to the flattening of the surface 60, the lower conical surface 62 of the carrier is flattened inwardly under the outside of the packing ring to confine it as shown at 76. In this plane, as in the plane of Figure 2, the collapse or deformation of the carrier probably causes two resultant forces, one acting radially of the nipple 28 forcing the packing material against the smooth area 34 on said nipple, and another acting radially of the conduit causing the packing to be compressed against and to form a seal with the surface 74 which is a part of the outer curved wall of the conduit. It may be said, of course, that the resultant of all of the forces in the packing material acts inwardly toward the union of the fitting and the conduit, so that a tight seal is formed at the union where the surface 74 meets the surface 34; i. e., the line of junction between the curved wall of the conduit and the smooth wall of the nipple.

The sealing member being such that the packing is completely confined, the packing will be under heavy compression. This compression will tend to equalize throughout the entire inside of the sealing member, so that the pressure built up at the extreme points of deformation, as shown in Figure 3, can be said to be exerted around throughout the packing material to the points in the plane of Figure 2, this being the plane of minimum deformation of the sealing member.

Referring to Figure 1, it will be noted how the sealing member accommodates itself to the outside surface of the conduit. At the point 80, the sealing member is quite thick to fill the maximum space between the follower nut and the outside of the conduit, while at point 82 the sealing member is relatively thin. Between these points, the thickness of the sealing member gradually varies in accordance with the shape of the outer surface of the conduit, the packing material being completely confined at all points.

It will be noted in this and the other views, that none of the packing material is exposed and is thus protected against deterioration. We have found by experience that such a packing material as rubber, when maintained under high compression, has little tendency to deteriorate.

Figure 6 shows a sealing member quite similar to that described in connection with Figures 4 and 5, except that the conical surface 62' does not extend down to the flat bottom 50 of the packing ring. This type of sealing member will perform effectively in substantially the same manner as that described in connection with the preferred form, but it is believed that the type of sealing member of the principal embodiment gives a tighter seal and provides more protection for the packing material.

After the sealing member has been deformed as shown in Figure 3 to the shape of the outer wall of the conduit, bitumen may be poured over the joint, filling in the space 16 where the coating of the conduit was removed, and the bitumen may be used to entirely cover the parts of the joint, such as the sealing member and the follower nut 40, but this is not necessary.

It will be understood that the present invention is not confined to the precise construction and application disclosed herein. The invention may be applied to other connections, and the body to which the fitting is secured need not be of the shape disclosed in the drawing. The fitting could well be used as an attachment against any curved surface, such as the surface of a tank. It is obvious that various changes may be made in the construction shown herein without departing from the invention.

We claim:

1. A sealing member comprising a hollow ring-shaped carrier of thin deformable metal, and a ring of compressible packing material mounted in and filling the interior of said carrier, said packing ring having top and outer walls and exposed inner and bottom walls, said carrier substantially confining the top and outer walls of said packing ring, while leaving the inner and bottom walls thereof exposed, the wall of said carrier which confines the outer wall of said packing ring comprising upper and lower conical surfaces which meet in a bend extending around said sealing member.

2. A sealing member comprising a hollow ring-shaped carrier of thin deformable metal, and a ring of compressible packing material mounted in and filling the interior of said carrier, said packing ring having a substantially cylindrical exposed inner wall and an exposed bottom wall, said carrier substantially confining the outer wall of said packing ring, the wall of said carrier which confines the outer wall of said packing ring being arched in form, the maximum diameter of said carrier being at a circular bend in the arched wall thereof located between the top and bottom walls of said packing ring, the arched wall of said carrier tapering inwardly from its circular bend on opposite sides thereof toward the top and bottom walls of said packing ring.

3. A sealing member comprising a hollow ring-shaped carrier of thin deformable metal, and a ring of compressible packing material mounted in and filling the interior of said carrier, said packing ring having a flat top wall, an outer wall, a substantially straight exposed inner wall, and an exposed bottom wall, said carrier substantially confining the outer wall of said packing ring, the wall of said carrier which confines the outer wall of said packing ring being arched in form, the maximum diameter of said carrier being at a circular bend in the arched wall thereof located adjacent the middle of the thickness of said sealing member, the arched wall of said carrier being turned inwardly from said circular bend at the maximum diameter of said carrier on opposite sides thereof toward the top and bottom walls of said packing ring.

4. In a joint between a pipe and fitting attached thereto, means for sealing said joint comprising a hollow ring-shaped carrier of thin deformable metal, and a ring of compressible packing material mounted in and filling the interior of said carrier, said packing ring having top and outer walls and exposed inner and bottom walls, said carrier substantially confining the outer wall of said packing ring, while leaving the inner and bottom walls thereof exposed, said sealing member being compressed to a maximum extent at opposed points in a line extending longitudinally of the pipe, and to a minimum extent at opposed points in a plane extending laterally of the pipe.

FRANK H. MUELLER.
WALTER J. BOWAN.
ELMER H. FAWLEY.